F. H. JOHNSON.
SYSTEM AND MEANS OF CONTROL.
APPLICATION FILED NOV. 2, 1915.
1,323,867.
Patented Dec. 2, 1919.
2 SHEETS—SHEET 1.
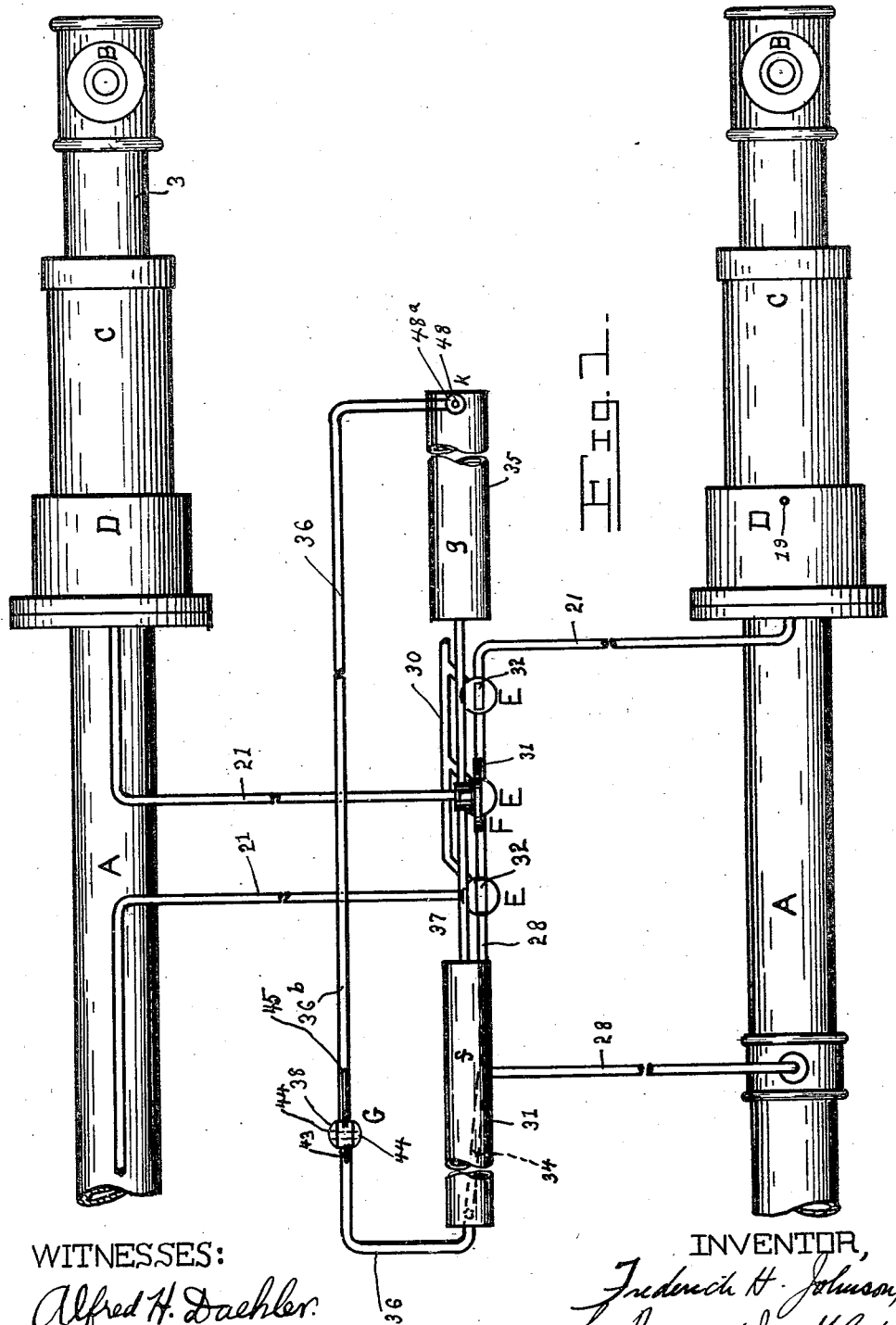
WITNESSES:
Alfred H. Daehler.
F. Alice Crandall.
INVENTOR,
Frederick H. Johnson;
by Raymond [illegible]
HIS ATTORNEY.

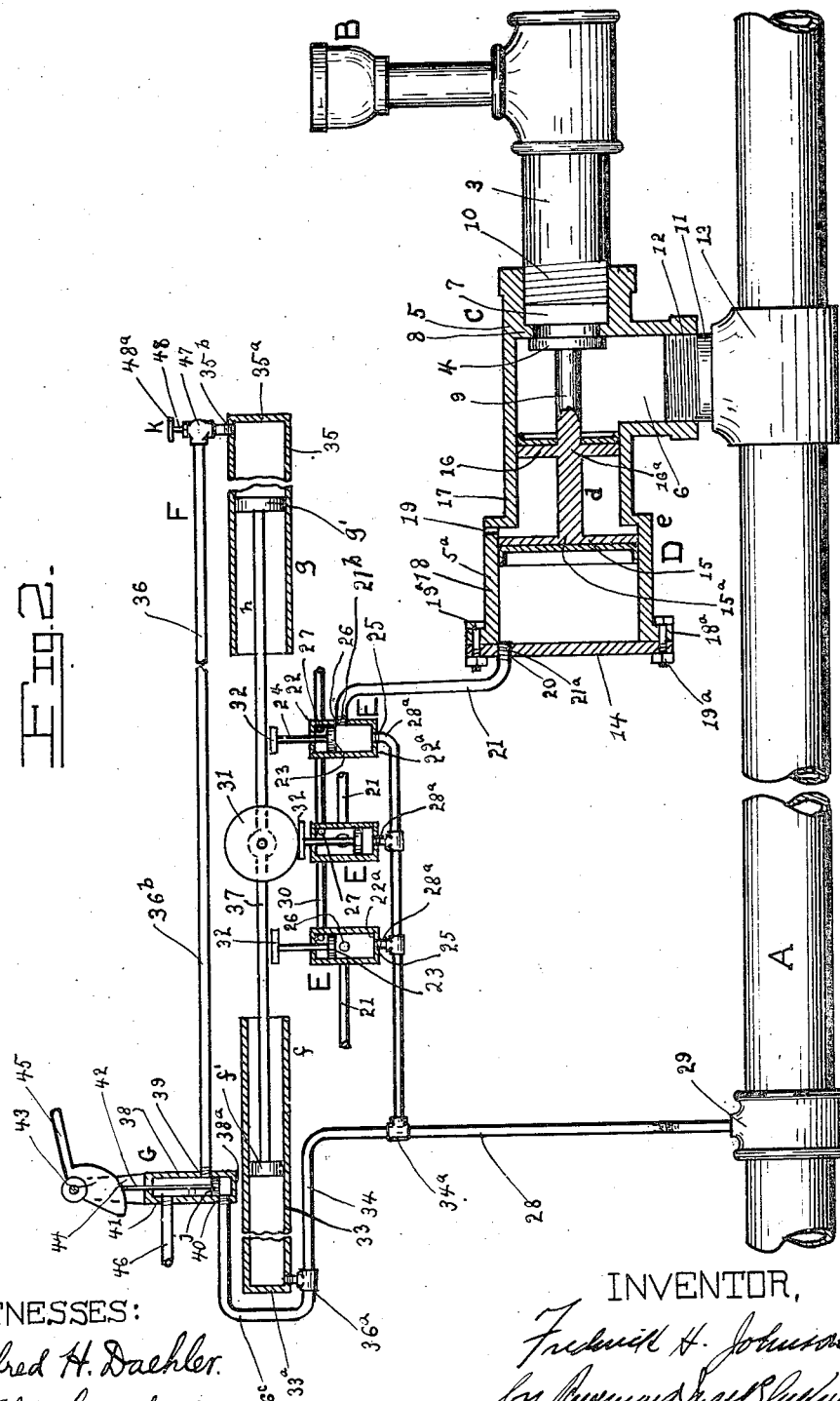

UNITED STATES PATENT OFFICE.

FREDERICK H. JOHNSON, OF SOUTH PASADENA, CALIFORNIA, ASSIGNOR TO HADDEN AUTOMATIC SPRINKLER COMPANY, OF LOS ANGELES, CALIFORNIA, A CORPORATION OF CALIFORNIA.

SYSTEM AND MEANS OF CONTROL.

1,323,867.   Specification of Letters Patent.   Patented Dec. 2, 1919.

Application filed November 2, 1915. Serial No. 59,293.

*To all whom it may concern:*

Be it known that I, FREDERICK H. JOHNSON, a citizen of the United States, residing at South Pasadena, in the county of Los Angeles and State of California, have invented new and useful Improvements in Systems and Means of Control, of which the following is a specification.

This invention relates to systems and means of control, and it has for its object to provide improvements of this general character which will be applicable to a variety of devices or mechanisms, and whereby the same may be controlled, with respect to operativeness, by means of controlling means which may be operated, if desired, by only a small fraction of the power necessary to operate or set in operation the device or mechanism so controlled. In accordance with the invention a single device may be controlled as to operativeness, from a suitable point of control, which point of control may be adjacent to or remote from such device, or a plurality of such devices may be controlled from a suitably located point of control, and, furthermore if desired, such plurality of devices may be successively set into operation and each such device may be permitted to operate for a predetermined period of time independent of the predetermined period of time of operation of the others of such devices. The invention further is concerned with the provision, when desired, of operating means for the aforementioned controlling means and such operating means may be energized by any suitable motive power, which motive power is in turn controlled through a master controller.

Many useful applications of the invention will suggest themselves and one class of work to which the invention may be applied is illustrated in the drawings, namely, the operation of a plurality of valves or the like controlling the flow of a fluid from suitable mains to the point of use of the fluid. In the application of the invention to such use, fluid pressure for operating the valves controlling the flow from the mains may be drawn from the mains and controlled with respect to its application to valve operating means by the controlling means of the system and the operating means for the valve controlling means may likewise be operated by fluid pressure from the main or mains, subject to control by the master controller which preferably is manually operated.

With the above and other objects in view, the invention consists in the novel and useful provision, construction, combination, formation, relative arrangement and interrelation of parts, members and features, all as hereinafter described, shown in the drawings and finally pointed out in claims.

In the drawings:

Figure 1 is a fragmentary plan view of a system and means of control organized, constructed and used in accordance with the invention, the same being shown as applied to, or incorporated in, a sprinkling system in which a plurality of sprinkler heads are successively supplied with water; and, Fig. 2 is a fragmentary side elevation, partly in section, of the showing in Fig. 1.

Corresponding parts in all the figures are designated by the same reference characters.

Referring with particularity to the drawing, in the embodiment of the invention therein shown, A designates a water main which supplies a plurality of lawn sprinklers B, each of which is provided with valve means C for controlling the supply of water from the main to the respective sprinkler. Each of the valve means C is operated by means of its respective valve operating means D, controlling means E being provided for each such valve operating means D. Operating means F may be provided for the controlling means and be in turn controlled by a master controller G.

The water main A leads from a suitable source of water supply and may be arranged to lead to each of the sprinklers B, or each such sprinkler B may be fed from the main A through suitable branch pipes 3, the valve means C controlling each sprinkler being arranged to control the passage of water through the pipe 3 and such valve means may comprise a compression valve 4 provided in a valve casing 5 provided with a water inlet passage 6 and a water outlet passage 7 and with an apertured partition 8 forming a seat for the compression valve 4. A valve operating stem 9 on which the valve 4 is mounted extends to the valve operating means D, which may be arranged to operate in an extension 5$^a$ of the valve casing 5, The pipe 3 is threaded into the valve casing 5 as at 10, and the valve casing 10 is connected to the water main by a nipple 11 threaded into the casing 5, as at 12, threaded into a suitable pipe-T or other device 13, which is provided in or on the main at the point of connection with the valve casing 5.

Each of the valve operating means D comprises a differential piston device $d$ and a differential cylinder $e$ formed by the extension $5^a$ of the valve casing 5, and having a cylinder head 14. The differential piston device $d$ may be formed by a piston 15 secured to the end $15^a$ of the valve stem 9, and a piston 16 secured to such valve stem 9 at a point between the piston 15 and the valve 4, as at $16^a$. The differential cylinder $e$ comprises a cylinder portion 17 fitting the piston 16 and communicating, on that side of the piston 16 adjacent to the valve 4, with the water inlet passage 6 of the valve casing 5, and a cylinder portion 18 of greater diameter than the cylinder portion 17 in which the piston 15 fits and reciprocates. A vent 19 is provided in the wall of the differential cylinder at a point between the pistons 15 and 16 of the differential piston device $d$, and an air dome may be connected thereto if desired. The cylinder head 14 may be secured to the cylinder 18 by means of bolts $19^a$ passed through such cylinder head and through a lateral flange $18^a$ on the cylinder 18, and by removal of such cylinder head 14, access may be had to the working parts of the valve means C and the valve operating means D. An orifice 20 is provided in the cylinder head 19 to receive the threaded end $21^a$ of a relatively small pipe 21 communicating with the interior of the cylinder 18 and leading to controlling means E of the respective valve operating means D.

The controlling means E for each of the valve operating means D preferably comprises a cylinder 22, a piston 23, and piston rod 24. The cylinder 22 is provided with a water inlet port 25 near its head $22^a$, a water port 26 into which one end of the pipe 21 is threaded as at $21^b$, and a discharge port 27 in the end of the cylinder opposite the cylinder head $22^a$, the ports 25, 26 and 27 being spaced apart such distances longitudinally of the cylinder 22 that the piston 23 may be positioned either between the ports 25 and 26 or the ports 26 and 27. In the drawings three such controlling means units are illustrated and connection is made between the cylinders 22 of each such controlling means units and the water main through a pipe 28 tapped into the main A through a suitable T or other connecting device 29, such pipe 28 branching as at $28^a$ to connect with each of the ports $22^a$, one of which is provided in each of the cylinders 22. A manifold discharge pipe 30 may be employed to carry the waste water to convey the waste water from the ports 27.

The operating means F for the controlling means E may comprise a pair of cylinders $f$ and $g$, a differential piston device $h$, a wheel cam 31, and means 32 upon each of the piston rods 24 of the controlling means E and coacting with the wheel cam 31. The cylinder $f$ preferably consists of a cylindrical shell 33 provided with a cylinder head $33^a$ connected with the water main by a relatively small pipe 34 which is tapped into the cylinder $f$ near the head $33^a$ thereof, and which may connect with the water main A through the pipe 28 with which it may be connected by means of a pipe-T as at $34^a$. The cylinder $g$ preferably consists of a cylindrical shell 35, closed at one end by a cylinder head $35^a$ and connected by means of a pipe 36 with the water main A, subject, however, to control by the master controller G which the pipe 36 is interrupted to receive, and such connection of the cylinder G and the water main may be made by threading the end of the pipe 36 into an orifice $35^b$ provided in the cylinder $g$ near the end thereof, and threading the other end of such pipe into a pipe-T or the like $36^a$ provided on the pipe 34; this connecting the pipe 36 with the pipe 34 and the pipe 34 in turn with the pipe 28, in many cases results in the economizing of pipe, although it will be understood that direct connection may be made as between the several portions or members of the system and the mains. The differential piston device $h$ preferably comprises a piston $f'$ disposed in the cylinder $f$, a larger piston $g'$ disposed and fitting in the cylinder $g$, and rigid connecting means, consisting of a piston rod 37, uniting the pistons $f'$ and $g'$. The wheel cam 31 is pivoted on the rod 37 in such position as to successively ride over the means 32 when the operating means F is in action. The means 32 coacting with the wheel cam 31 may each comprise a cam face or bar extending transversely of its respective piston rod 24, and such bars 32 may be of different length so that the period of dwell of the wheel cam 31 on each bar may be different if desired, and the operative devices controlled by the controlling means E may thereby be maintained in operation, each for an independent period of time.

The master controller G in the form shown in the drawings, comprises a cylinder 38 and a piston $j$, together with means for operating the piston $j$. The cylinder is provided with a port 39 spaced slightly above or away from the cylinder head $38^a$, a port 40 at the cylinder head $38^a$ and a drain port 41 in the cylinder wall near the end of the cylinder opposite the cylinder head $38^a$. The pipe 36, as hereinbefore stated, is interrupted to receive the master controller G, and the pipe 36 is offset at the cylinder 38 of the master controller G so that a portion 36ᵇ of the pipe 36 leads from the port 39 of the cylinder 8 to the cylinder g, and a portion 36ᶜ of the pipe leads from the port 40 of the cylinder 38 to the pipe-T at 36ᵃ. The ports 39, 40 and 41 are arranged at sufficient distances apart longitudinally of the cylinder to permit the positioning of the piston j either between the ports 39 and 40, or between the ports 39 and 41, as such piston j is manipulated by means of the operating means of the master controller which may comprise a push rod 42 on the piston j, and a cam 43 mounted on a bracket 44 extending from the cylinder 38. A handle 45 may be provided for manually operating the cam, which manual operation will throw the sprinklers into or out of operation, as may be desired. A waste pipe 46 is threaded into the port 41 of the cylinder 38. The portion 36ᵇ of the pipe 36 is interrupted to receive a needle valve device k, which comprises a valve casing 47 in which is accommodated the usual needle valve 48 which may be adjusted by means of a hand wheel 48ᵃ.

The operation, method of use and advantages of the improved system and means of control will be readily understood from the foregoing description taken in connection with the accompanying drawings and the following statement.

If the cam 43 of the master controller G be manipulated by means of the handle 45, so as to position the piston j between the ports 39 and 40, the water supply to the cylinder g of the operating means for the controlling means will be cut off and the interior of the cylinder g will communicate through the pipe portion 36ᵇ and the interior of the cylinder 38 through the port 41 with the waste pipe 46 provided at the port 41, thus permitting the discharge of the water behind the piston g' in the cylinder g through the waste pipe 46, such discharge being caused by the movement of the piston g' toward the cylinder head 35ᵃ under actuation by the water pressure in the cylinder f, which is always in communication with the water under pressure in the main A, such water pressure acting on the piston g through the piston f and the connecting rod 37. As the water being discharged from the cylinder g must pass the needle valve device k, the time elapsing during a stroke of the pistons g and f is dependent upon the adjustment of such needle valve device k. During the movement of the piston f away from the cylinder head 33ᵃ, the wheel cam 31 is caused to successively ride over and depress the bars 32 and depress the pistons 23 of the controlling means E, and when a piston of the controlling means E is so depressed or moved against the water pressure of the main A which is admitted beneath the pistons 23, such piston 23 will lie between its respective ports 26 and 25, thus allowing the water previously admitted to the cylinder 18 to escape through the port 26 into the interior of the respective controlling means cylinder 22 and through the respective port 27 to the discharge or drain pipe 30, the piston 15 of the respective valve operating means D expelling the water from the interior of the cylinder 18, movement of such piston being caused by the water pressure from the main which is admitted to the valve side of the piston 16 provided on the valve stem 9, the valve 4 on such stem 9 being of smaller diameter than the piston 16 and being overbalanced by the pressure on the piston 16, thus moving the valve 4 away from its seat and permitting the flow of water from the main A through the aperture in the partition 8, and through the respective sprinkler B. The valve remains in this open position as long as its respective controlling piston 23 is depressed, but as soon as the wheel cam has passed over the respective bar 32, the water pressure from the main, which is always acting to drive the piston to normal position, so drives the piston 23 to its normal position, which is between the ports 26 and 27. This normal positioning of the piston permits water under pressure to enter the respective valve operating means cylinder 18 through the pipe 21, and, the piston 15 being larger than the piston 16, the pressure against such piston 15 easily overcomes the resistance to movement of the piston 16 and forces the valve 4 to its seat, thus shutting off the supply of water to the respective sprinkler head B. The valve 4 remains in closed position until the next operation or actuation of its respective controlling means by the wheel cam 31 or otherwise.

When the cam 43 is manipulated to allow the master controller piston j to move to normal position under influence of the water pressure which is always acting to so move the piston j to normal position, namely, to position between the ports 39 and 41, water from the main A is admitted to the cylinder 35 by way of the pipe 28, the pipe portion 36ᶜ, the port 40, the interior of the cylinder 38, the port 39, the pipe portion 36ᵇ and past the needle valve device k, and the cylinder g, together with its piston g' being of larger diameter than the cylinder f and its piston f', the differential piston device h will be returned to its normal position, namely, with the piston f' near the cylinder head 33ᵃ. It is apparent that this return is due to the over-balancing of the pressure on the head of the piston f' by the pressure on the head of the larger piston g' when the parts are in normal position and water pressure from the mains is admitted to both cylinders $f$ and $g$.

If it is desired to multiply the devices actuated or to subdivide the effects of the actuation of one of the controlling cylinders E so that one or each of such cylinders may control a plurality of devices, with respect to operation, instead of each controlling a single device as shown in the drawings, it is but necessary to connect one of the pipes 21 with the operating cylinder $g$ of a controlling means operating device organized as is the controlling means operating means F, and make connection between the water main and the cylinder $f$ of such controlling means operating device.

It is manifest that many changes may be made in the provision, construction, formation, association and relative arrangement of features, parts and members in adapting the invention to varying services in the various arts and for actuation by power other than hydraulic, all without departing from the spirit of the invention and the terms of the following claims.

Having thus disclosed my invention, I claim and desire to secure by Letters Patent:

1. In hydraulic apparatus of the character disclosed, the combination with a hydraulic feed pipe, of a plurality of working devices at all times subject to the pressure of the fluid in the pipe and held in one position thereby, a master differential piston having one end thereof always under the pressure of the feed pipe, valve controlled means for admitting pressure from the feed pipe to the other end of the master differential piston, and means actuated by the movements of the master differential piston for operating the working devices in sequence.

2. In hydraulic apparatus of the character disclosed, the combination with a hydraulic feed pipe, a plurality of working devices at all times subject to the pressure of the fluid in the pipe, a differential piston actuated by the pressure of the fluid in the pipe, and means actuated by the differential piston for operating the working devices in sequence, each working device being returned to its original position before the next working device is operated.

3. In hydraulic apparatus of the character disclosed, the combination with a hydraulic feed pipe, of a plurality of working devices at all times subject to the pressure of the fluid in the pipe, a differential piston having the small end thereof always under the pressure of the feed pipe, valve controlled means for admitting pressure from the feed pipe to the large end of the piston, and means actuated by the movements of the differential piston for operating in sequence the working devices, each of the working devices being moved against the fluid pressure of the pipe and being permitted to return to its original position before the next working device is actuated.

4. In hydraulic apparatus of the character disclosed, the combination with a hydraulic feed pipe, of a plurality of working devices at all times subject to the pressure of the fluid in the pipe and held in one position thereby, a series of plungers corresponding to the working devices, means actuated by each plunger for operating the corresponding working device, a differential piston actuated by the pressure of the fluid in the feed pipe, and cam means actuated by the movements of the differential piston for operating the plungers in sequence.

5. In hydraulic apparatus of the character disclosed, the combination with a hydraulic feed pipe, of a plurality of working devices at all times subject to the pressure of the fluid in the pipe and held in one position thereby, a corresponding series of plungers, means actuated by the plungers for causing the corresponding working devices to be moved against the pressure of the fluid, heads upon the plungers, a differential piston arranged transversely with respect to the plungers, the small end of the differential piston being always subject to the pressure of the feed pipe, valve controlled means for permitting the pressure of the feed pipe to operate upon the large end of the differential piston, and cam means on the piston for successively engaging the heads of the plungers to operate the same.

6. In hydraulic apparatus of the character disclosed, the combination with a fluid feed pipe, of a series of differential pistons, each of which has one end thereof always subject to the pressure of the feed pipe, control elements actuated by the respective differential pistons, a master differential piston having one end thereof always acted upon by the fluid pressure of the feed pipe, valve controlled means for admitting the fluid pressure of the feed pipe to the other end of the differential piston, and means actuated by the master differential piston for admitting fluid pressure to the differential pistons to operate the same in sequence.

7. In hydraulic apparatus of the character disclosed, the combination with a hydraulic feed pipe, of a plurality of working devices at all times subject to the pressure of the fluid in the pipe and held in one position thereby, a series of valves corresponding to the working devices, means coöperating with the working devices to actuate the corresponding valves, a differential piston actuated by the pressure of the fluid in the feed pipe and means actuated by the movements of the differential piston for operating the working devices in sequence.

8. In hydraulic apparatus of the character disclosed, the combination with a fluid feed pipe, of a series of differential pistons having the small ends thereof always subject to the pressure of the feed pipe, control elements actuated by the respective differential pistons, a master differential piston having the small end thereof always acted upon by the fluid pressure of the feed pipe, valve controlled means for admitting the fluid pressure to the large end of the master differential piston, and means actuated by the master differential piston for admitting fluid pressure to the large end of each of the series of differential pistons in sequence.

9. In hydraulic apparatus of the character disclosed, the combination with a hydraulic feed pipe, of a series of differential pistons having the small ends thereof always subject to the pressure of the feed pipe, independent control elements actuated by the respective differential pistons, a corresponding series of valves for admitting fluid pressure to the large end of each of the differential pistons, a master differential piston having the small end thereof always subject to the pressure of the feed pipe, valve controlled means for admitting the fluid pressure to the large end of the master differential piston, and means actuated by the master differential piston for successively operating the before mentioned valves to operate the series of first mentioned differential pistons in sequence.

10. In hydraulic apparatus of the character disclosed, a plurality of separate fluid service devices, a fluid service supply associated with the devices, a valve operatively associated with and controlling each of the devices as to service, and means for operating said valves to permit fluid service from said devices comprising a plurality of separate valves the opening actions of which cause said first named valves to open, and the closing actions of which cause said first named valves to close and cut off fluid service at said devices, and means for successively operating the last named valves causing one of said valves to open and close before the succeeding valve is operated.

11. In hydraulic apparatus of the character disclosed, a plurality of fluid service devices, fluid feed pipes connected with the devices, a plurality of pressure controlled valves controlling the respective fluid passages from the feed pipes to the service devices and being at all times subject to the hydraulic influence of fluid passing from the feed pipes to the service devices and normally held closed by an influence greater than said hydraulic influence, a plurality of valves operatively associated with the first named valves and which when closed will cause said first named valves to be subjected to a hydraulic influence which will close said first named valves, and means for opening said last named valves successively to cause successive release of the last named hydraulic influence upon the valves and allow the first named valves to open under the first named hydraulic influence, said means acting to open and close one of the last named valves before the operation of the succeeding valves whereby service action from one of said service devices is given and completed prior to service action from another of said service devices.

In testimony whereof, I have signed my name to this specification in the presence of two subscribing witnesses.

FREDERICK H. JOHNSON.

Witnesses:
ALFRED H. DAEHLER,
FRANCIS L. ISGRIGG.